(12) United States Patent
Pfosi et al.

(10) Patent No.: US 11,539,624 B2
(45) Date of Patent: Dec. 27, 2022

(54) FINE-GRAINED CONTROL OVER ROUTING RESOLUTION BEHAVIOR

(71) Applicant: Arista Networks, Inc., Santa Clara, CA (US)

(72) Inventors: Joshua Pfosi, Somerville, MA (US); Vaibhavkumar Shah, Mumbai (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/348,599

(22) Filed: Jun. 15, 2021

(65) Prior Publication Data

US 2022/0166717 A1    May 26, 2022

(51) Int. Cl.
*H04L 45/745* (2022.01)
*H04L 45/00* (2022.01)
*H04L 45/24* (2022.01)
*H04L 45/748* (2022.01)

(52) U.S. Cl.
CPC ............ *H04L 45/745* (2013.01); *H04L 45/20* (2013.01); *H04L 45/24* (2013.01); *H04L 45/748* (2013.01)

(58) Field of Classification Search
CPC ....... H04L 45/20; H04L 45/24; H04L 45/745; H04L 45/748
See application file for complete search history.

(56) References Cited

U.S. PATENT DOCUMENTS

| | | | | |
|---|---|---|---|---|
| 7,230,912 | B1 * | 6/2007 | Ghosh | H04L 43/026 370/242 |
| 8,532,127 | B2 * | 9/2013 | Kompella | H04L 45/60 370/408 |
| 8,953,626 | B2 * | 2/2015 | Kompella | H04L 12/44 370/408 |
| 9,253,086 | B2 * | 2/2016 | Ramanathan | H04L 45/306 |
| 9,391,873 | B1 * | 7/2016 | Kompella | H04L 45/60 |
| 10,404,598 | B1 * | 9/2019 | Sinn | H04L 45/04 |
| 10,419,328 | B1 * | 9/2019 | Dave | H04L 47/125 |
| 10,547,548 | B2 * | 1/2020 | Dale | H04L 45/748 |
| 10,659,362 | B1 * | 5/2020 | Sellappa | H04L 45/50 |
| 10,805,202 | B1 * | 10/2020 | Koppula | H04L 45/741 |
| 10,992,566 | B1 * | 4/2021 | Dave | H04L 45/745 |
| 2002/0080755 | A1 | 6/2002 | Tasman et al. | |
| 2010/0040062 | A1 | 2/2010 | Tasman et al. | |
| 2011/0069706 | A1 * | 3/2011 | Sen | H04L 45/741 370/392 |
| 2011/0235545 | A1 * | 9/2011 | Subramanian | H04L 45/04 370/254 |

(Continued)

OTHER PUBLICATIONS

International Search Report in International Patent Application No. PCT/US2021/059194 dated Feb. 4, 2022; 16 pages.

*Primary Examiner* — George C Neurauter, Jr.

(74) *Attorney, Agent, or Firm* — Fountainhead Law Group P.C.

(57) ABSTRACT

Routes in an address group are generally resolved according to a next hop resolution profile that applies across the address group. Individual next hop resolution profiles can be defined and associated with specific routes within the address group. Those specific routes are resolved according to their respective associated next hop resolution profiles, thereby bypassing the next hop resolution profile of the address group to provide control over the resolution behavior at the granularity of individual routes within the address group.

19 Claims, 10 Drawing Sheets

(56) References Cited

U.S. PATENT DOCUMENTS

2013/0074177 A1   3/2013  Varadhan et al.
2016/0119235 A1   4/2016  Ferguson et al.
2017/0264552 A1*  9/2017  Duda ..................... H04L 45/50

* cited by examiner

FINE-GRAINED CONTROL OVER ROUTING RESOLUTION BEHAVIOR

CROSS REFERENCE TO RELATED APPLICATIONS

Pursuant to 35 U.S.C. § 119(a), this application is entitled to and claims the benefit of the filing date of Indian Provisional Patent Application Number 202041051169, filed 24 Nov. 2020 in India, and entitled "Fine-Grained Control Over Routing Resolution Behavior For Internet Services," the content of which is incorporated herein by reference in its entirety for all purposes.

This application is related to commonly owned U.S. application Ser. No. 16/919,005, entitled "Custom Routing Information Bases for Network Devices," filed Jul. 1, 2020, the content of which is incorporated herein by reference in its entirety for all purposes.

BACKGROUND

When an ingress packet in a network device is received, it may be processed and forwarded on to a directly connected neighbor, sometimes referred to as a next hop device. The forwarding operation involves determining an egress interface on which to forward the packet based on contents of the ingress packet, for example the destination Internet Protocol (IP) address, to reach a directly connected neighbor. The network device can learn the destination IP address-to-egress interface mapping from routes advertised by neighboring network devices. These routes specify a destination prefix and a next hop address, which informs the network device that a packet whose destination IP address is covered by the destination prefix can be reached by forwarding the packet to the next hop address specified in the route. If the next hop address is expressed as an IP address, the network device needs to resolve that next hop address to one of the interfaces on the network device and a lower layer address such as the Ethernet MAC address of the immediate neighbor to which the ingress packet needs to be forwarded. The resolved interface becomes the egress interface for packets covered by the destination prefix. The process of determining an egress interface and the MAC address of the immediate neighbor from the next hop IP address is referred to variously as route resolution, next hop resolution, and so on.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the large networks of global service providers, not all packet flows are subject to uniform treatment. Given services such as Layer 3 Virtual Private Networks (L3VPNs), Layer 2 (L2) and L3 Ethernet VPNs (EVPNs), EVPN Virtual Private Wire Service (EVPN VPWS), 6PE configurations, and so on, each service may have distinct requirements. Some services may vary in the importance of various network properties, for example, latency, availability, bandwidth, etc., while other services may vary in their guaranteed quality of service; for example, a higher paying customer may enjoy a lower congestion, higher bandwidth link. To support these requirements, service providers rely on various tunneling and traffic engineering (TE) technologies. It becomes necessary to provide a robust mechanism to select the proper tunneling technology for a given service. Even for the routes within a given service, a service provider may want the flexibility of distinct tunneling/TE behavior for different customers, and so this mechanism should differentiate between routes as well as services. The present disclosure provides a mechanism that enables such flexibility.

This present disclosure allows for a user-defined policy to be applied to all routes for a given set of services. The result of this policy application is a next-hop resolution behavior specified in the form of a next hop profile. This profile supports a priority list of resolution options so that if the primary resolution source fails, a secondary or tertiary resolution source can be used. The present disclosure addresses a challenge faced by service providers, namely that it is standard practice to differentiate various services routes with distinct values for these attributes. For example, a common technique is to use what are known as Border Gateway Protocol (BGP) extended color communities to "color" service routes. The present disclosure provides a mechanism to map this color to a resolution behavior, thus allowing the service provider control over the resolution behavior at the granularity of individual service routes. These routes are usually subsets of specific customer routes, allowing the service provider to offer differentiated services based on customers' service agreements.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
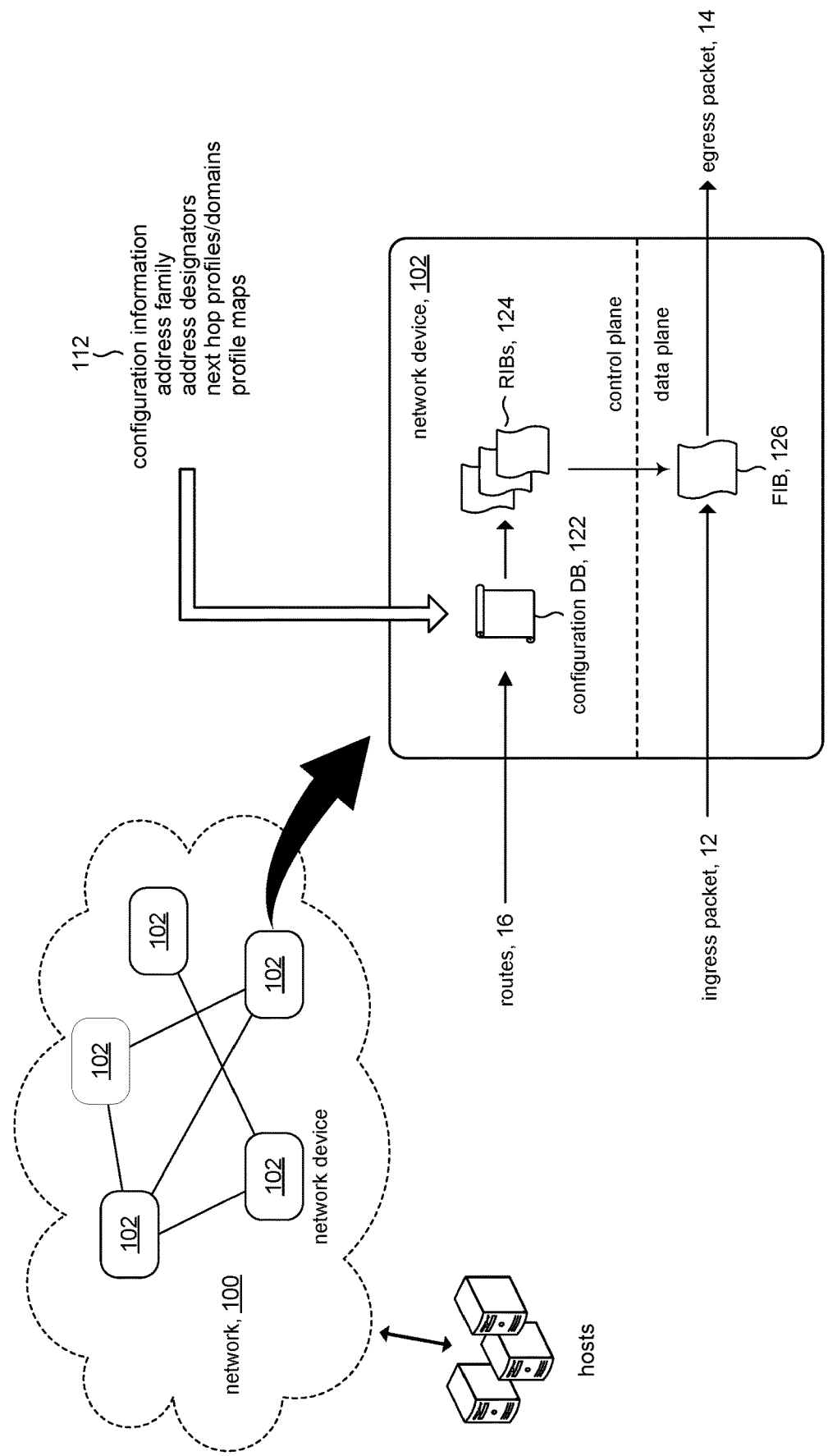
FIG. 1 shows a network device deployed in a network in accordance with some embodiments of the present disclosure.

FIG. 1 shows an illustrative network and a constituent network device in accordance with the present disclosure.

Network 100 can include any suitable configuration of network devices 102, including local area networks (LANs), wide area networks (WANs), metropolitan area networks, data centers, etc., and combinations thereof. Network devices 102 can be routers, switches, gateways, and the like.

Each network device 102 can be configured to receive next hop resolution configuration information 112. Next hop resolution refers to identifying ("resolving") an interface on the network device for a given next hop destination on which to forward an ingress packet to reach a directly connected neighbor. In accordance with the present disclosure, configuration information 112 informs or otherwise guides the next hop resolution behavior of the network device. In accordance with some embodiments, configuration information 112 can include an address family, address designators, next hop resolution profiles, and profile maps. Address designators designate or otherwise specify individual addresses or ranges of addresses covered by the address family.

Configuration information 112 can be provided to network device 102 by a user (not shown) communicating directly with the network device. In some embodiments, for example, a user can communicate over a local maintenance port on the network device using a suitable command line interface (CLI). In other embodiments, a user can communicate with the network device using typical provisioning software such as a web application programming interface (API), an OpenConfig™ interface, etc. In some embodiments, the configuration information can be provided from a central maintenance server (not shown), for example in a data center, to facilitate centralized maintenance of several network devices. The configuration information can be stored in a suitable data store in the network device. In some embodiments, for example, network device 102 can include configuration database (DB) 122 to store the configuration information.

Network device 102 can include routing information bases (RIBs) 124 and forwarding information base (FIB) 126, collectively referred to as forwarding tables, to support the forwarding of ingress packets 12. RIBs and FIBs are known data structures in a network device. Briefly, RIBs contain routing information learned via static definition (e.g., user, configuration manager, etc.) or by way of dynamic routing protocols (e.g., routes 16) such as Border Gateway Protocol (BGP), Open Shortest Path First (OSPF), etc. A route can include a destination prefix and a next hop which refers to the directly connected neighbor to which a packet is forwarded. A route informs the network device where (next hop) and how to forward an ingress packet that matches (is covered) by the destination prefix. The network device can store multiple RIBs to allow for multiple kinds of routes; e.g., directly connected routes, IP routes, etc. A FIB contains information that the network device uses to identify the interface on which a packet (e.g., ingress packet 12) will be forwarded for egress (e.g., egress packet 14) to reach a directly connected neighbor. A FIB is programmed using information contained in the RIBs. In accordance with the present disclosure, information stored in RIBs 124 and FIB 126 can be based on configuration information 112. These aspects of the present disclosure are described further below.

As noted above, configuration information 112 informs or otherwise guides the next hop resolution behavior in the network device. In accordance with some embodiments, the configuration information controls next hop resolution of routes received from other network devices or input by a user, and affects the programming of RIBs 124 and FIB 126.

In accordance with some embodiments of the present disclosure, configuration information 112 can include the following elements:
 address family
 address designations
 next hop profiles/next hop domains
 profile maps
Each of these elements is discussed briefly here and in more detail further below:

Address Family

An address family (address group) can be any suitable grouping of addresses. For example, an address family in the context of BGP identifies the set of Network Layer protocols to which the address carried in the Next Hop field must belong, the way in which the address of the next hop is encoded (such as IPv4 or IPv6), and the semantics of the Network Layer Reachability Information that follows (IPv4 prefixes or IPv6 prefix or VPN prefixes with labels). In accordance with some embodiments, an address family can be characterized by a set of next hop domains where every route covered by the address family is resolved according to one of the next hop domains in the set. BGP, for example, includes multiprotocol extensions that can be used to carry reachability (routing) information for multiple Network Layer protocols such as IPv4 Unicast, IPv6 Unicast, IPv4 Multicast, MPLS VPN routes, etc.

Address Designator

As will be discussed further below, address designators identify routes 16 (FIG. 1) to be associated with specific resolution profiles. An address designator can refer to one or more subsets (ranges) of addresses within or otherwise covered by the address family, expressed for example, using prefix notation. The prefix 192.0.1.0/24, for instance, is an example of an address designator that covers the address range 192.0.1.0 to 192.0.1.255. In accordance with some embodiments, an address designator can be an individual address or a list of addresses within the address family. For example, the unicast address 192.0.1.1 is an example of an address designator. Likewise, the list of individual addresses 128.0.100.1, 168.20.10.0, 192.100.200.1 is an example of an address designator. An address designator can refer to a combination of individual addresses and address ranges.

As noted above, address designators can identify routes using IP prefixes. More generally, however, address designators can identify routes based on any suitable attributes in addition to or instead of an IP prefix. For example, routes can be identified using BGP path attributes e.g. communities, Autonomous System (AS) path, next-hop, etc. For discussion purposes, however, examples of address designators given herein will be expressed using IP prefixes.

Next Hop Resolution Profiles/Next Hop Domains

As will be discussed further below, routes 16 are stored into RIBs 124 and FIB 126 in accordance with the next hop resolution profiles. In some embodiments, a next hop resolution profile comprises one or more next hop domains. Each next hop domain, in turn, is a data structure comprised of one or more routes. This structure can be expressed as follows:

NEXT HOP PROFILE:=NEXT HOP DOMAIN [, NEXT HOP DOMAIN] . . . .
 NEXT HOP DOMAIN:=ROUTE [, ROUTE] . . . .
 ROUTE:=DESTINATION, FORWARDING DECISION
 where DESTINATION—This attribute constitutes a match condition. Ingress packets that match (covered by) this attribute are forwarded according to FORWARDING DECISION. The DESTINATION attribute can be an IP address (e.g., expressed using prefix notation).

FORWARDING DECISION—This attribute generally contains information that identifies a directly connected neighbor (the next hop), and information (e.g., IP-next hop, MPLS label stack imposition, tunneling encapsulation, etc.) that may be needed to forward/encapsulate a received ingress packet to reach the directly connected neighbor. For routes in a next hop domain, the FORWARDING DECISION attribute further identifies a specific egress interface on the network device to reach the directly connected neighbor, in addition to the information (e.g., IP-next hop, MPLS label stack imposition, tunneling encapsulation, etc.) that may be needed to forward/encapsulate the packet to a specific directly connected neighbor on the egress interface. Because these routes identify the egress interface to reach a directly connected neighbor, the network device will know on which interface to forward a packet, and can be referred to herein as fully resolved routes, or resolved routes.

Figure 2:
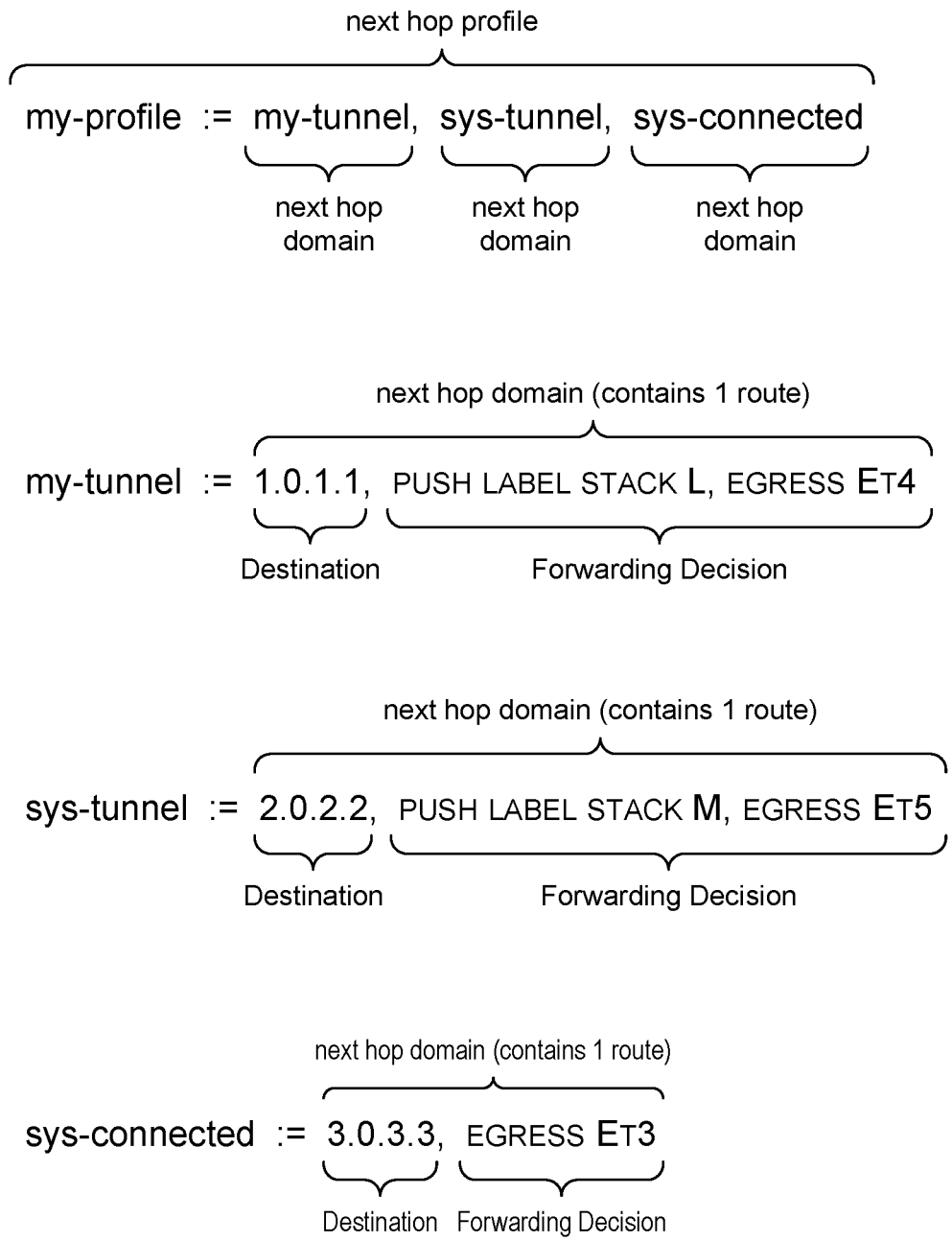
FIG. 2 shows an illustrative example of elements of a next hop profile in accordance with some embodiments of the present disclosure.

Referring to FIG. 2, the figure shows an illustrative example of a next hop resolution profile called MY-PROFILE. In the example, MY-PROFILE comprises three next hop domains. In the example, each domain comprises a single route; although, as indicated above, a domain can contain more than one route. In some embodiments, a next hop domain can be stored as a RIB in the network device. The network device may contain predefined next hop domain RIBs (system RIBs) and user-defined next hop domain RIBs (user RIBs). A next hop domain can reference one or more such RIBs.

Profile Maps

As will be discussed further below, profile maps inform which next hop resolution profile to use when resolving the next hop of a route. In some embodiments, a profile map represents an association between an address designator and a next hop profile. A profile map can associate an address family with a default next hop profile so that routes covered by the address family are resolved, by default, according to next hop domains that comprise the default next hop profile. In accordance with the present disclosure, the default next hop profile associated with an address family can be bypassed for specific routes within the address family. For example, profile maps can associate specific routes with corresponding specific next hop profiles so that packets on these routes can be forwarded differently from packets on other routes in the address family.

Figure 3:
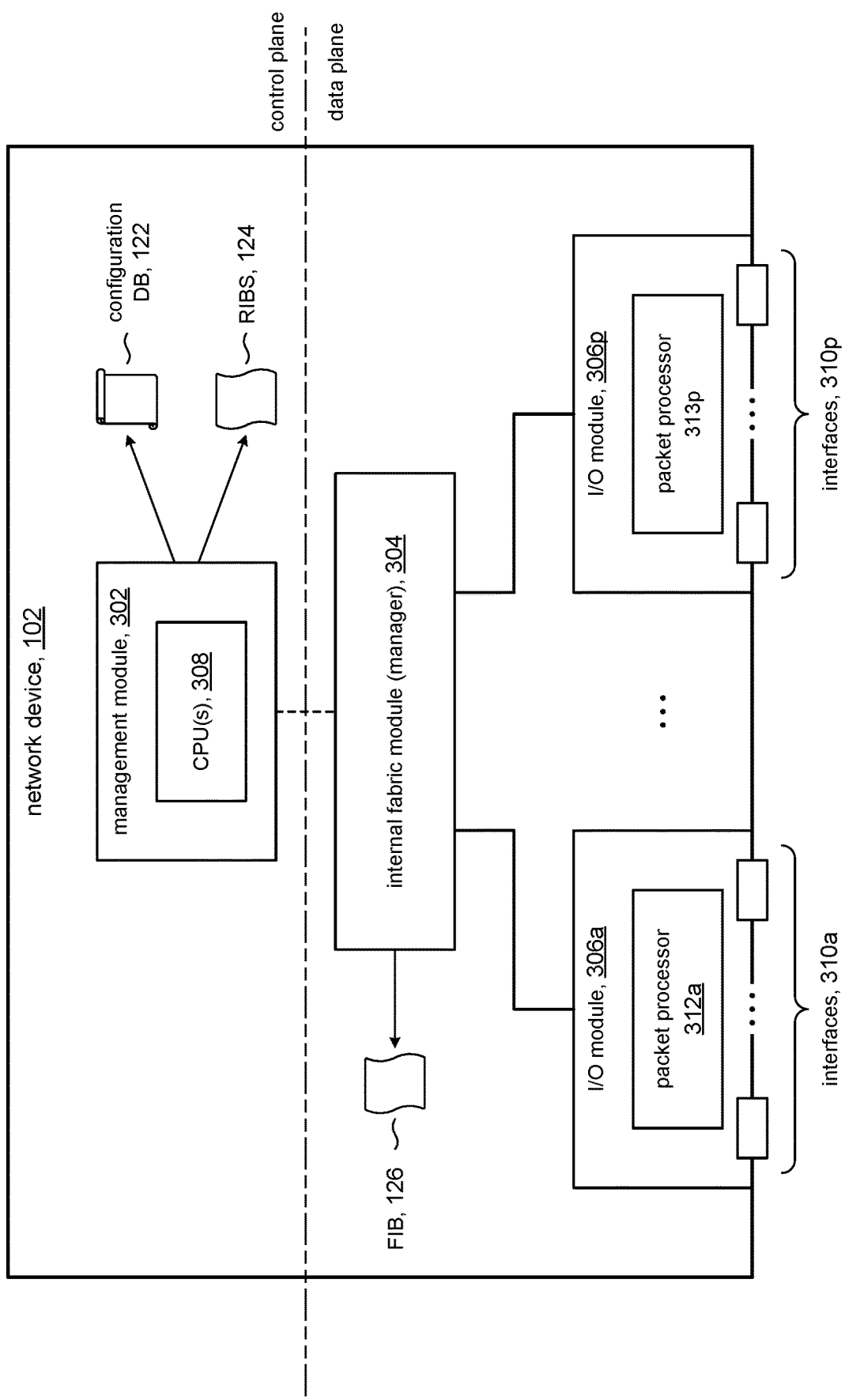
FIG. 3 shows an example of a network device in accordance with some embodiments of the present disclosure.

FIG. 3 depicts an example of network device 102 in accordance with some embodiments of the present disclosure. As shown, network device 102 can include management module 302, internal fabric module 304, and a number of I/O modules 306a-306p. Management module 302 represents the control plane (also referred to as control layer) of network device 102. Management module 302 can include one or more management CPUs 308 to manage configuration DB 122 and RIBs 124, and generally to manage and control operation of network device 102 in accordance with the present disclosure. Each management CPU 308 can be a general purpose processor, such as an Intel®/AMD® x86 or ARM® processor, that operates under the control of software stored in a memory (not shown), such as dynamic random access memory (DRAM). The control plane refers to all the functions and processes that determine which path to use, such as routing protocols, spanning tree, and the like.

Internal fabric module 304 and I/O modules 306a-306p collectively represent the data plane of network device 102. The data plane is also referred to as the data layer, forwarding plane, etc. Internal fabric module 304 can manage FIB 126. For example, information from RIBs 124 can be passed to the internal fabric module which can then program FIB 126.

Internal fabric module 304 can be configured to interconnect the various other modules of network device 300. Each I/O module 306a-306p can include one or more interfaces 310a-310p to send and receive network packets. Each I/O module 306a-306p can also include packet processor 312a-312p. Each packet processor 312a-312p can comprise forwarding hardware components (e.g., application specific integrated circuit (ASIC), field programmable array (FPGA), digital signal processing unit (DSP), content-addressable memory, etc.) configured to make wire speed decisions on how to process incoming (ingress) network packets and generate outgoing (egress) network packets.

Figure 4A:
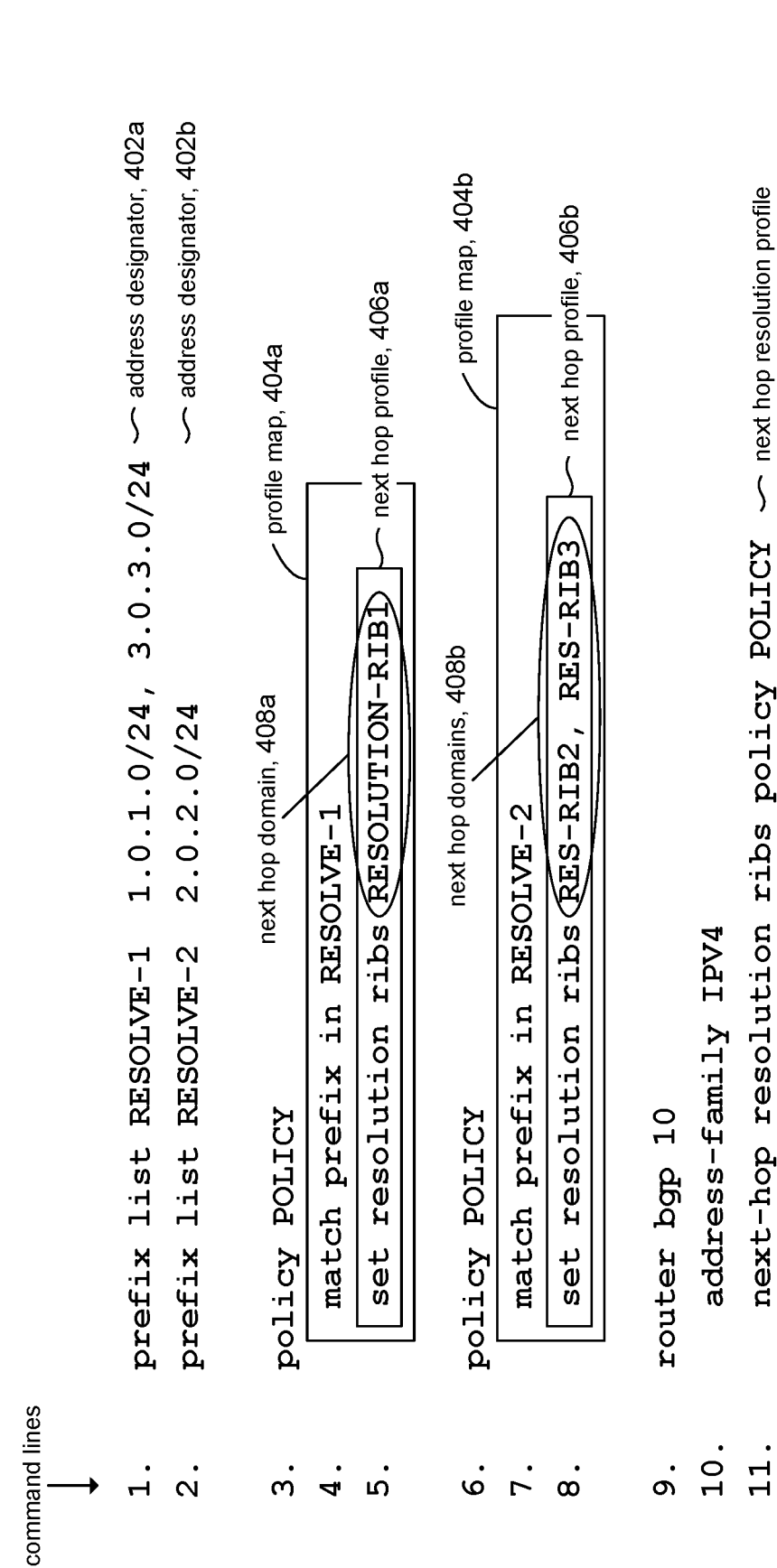
FIGS. 4A and 4B show examples of configuration information in accordance with some embodiments of the present disclosure.

FIG. 4A shows an example of configuration information used to configure next hop resolution behavior in a network device in accordance with some embodiments. In some embodiments, for example, configuration information 412 can be expressed as commands entered into the network device by a user via suitable CLI commands, such as shown in FIG. 4A. In other embodiments, configuration information 412 can be provided to the network device from a centralized management computer. It will be appreciated that the commands and command line syntax depicted in FIG. 4A are merely illustrative.

Command lines 1 and 2 represent address designators 402a, 402b using a prefix list command. Command line 1, for example, defines an address designator called RESOLVE-1 that includes two address ranges, expressed in prefix notation, in the address family (specified at command line 10). Command line 2 defines an address designator RESOLVE-2 that comprises a single range of addresses in the address family.

Command lines 5 and 8 define next hop resolution profiles 406a, 406b using a set resolution ribs command. Profile 406a comprises a single next hop domain 408a called RESOLUTION-RIB1, and profile 406b comprises two next hop domains 408b called RES-RIB2 and RES-RIB3. The next hop domains RESOLUTION-RIB1, RES-RIB2, and RES-RIB3 are previously defined RIBs, which can be system RIBs or user-defined RIBs.

Command lines 4-5 and 7-8 create profile maps 404a, 404b using a match command. Profile map 404a represents an association or mapping between the address designator RESOLVE-1 and next hop profile 406a. Profile map 404b associates the address designator RESOLVE-2 with next hop profile 406b. As discussed further below, a route that is matched by RESOLVE-1 will be resolved according to profile 406a. Likewise, a route that is matched by RESOLVE-2 will be resolved according to 406b. A policy command defines a mapping called POLICY that comprises profile maps 404a, 404b; e.g., command lines 3 and 6.

Command lines 9 and 10 identify an address family of IPV4 addresses. Command lines 10 and 11 associate the mapping POLICY with the address family; POLICY represents the next hop resolution profile for the address family. In particular, routes that are matched by the RESOLVE-1 address designator will be resolved according to next hop profile 406a, while routes that are matched by the RESOLVE-2 address designator will be resolved according to next hop profile 406b. Notably, for the configuration shown in FIG. 4A, routes not matched by RESOLVE-1 or RESOLVE-2 will remain unresolved and, for example, may be ignored. While this behavior may be the intended effect in some instances, in other instances the intended behavior may be to provide a default profile to resolve routes that are not matched by any of the address designators.

Figure 4B:
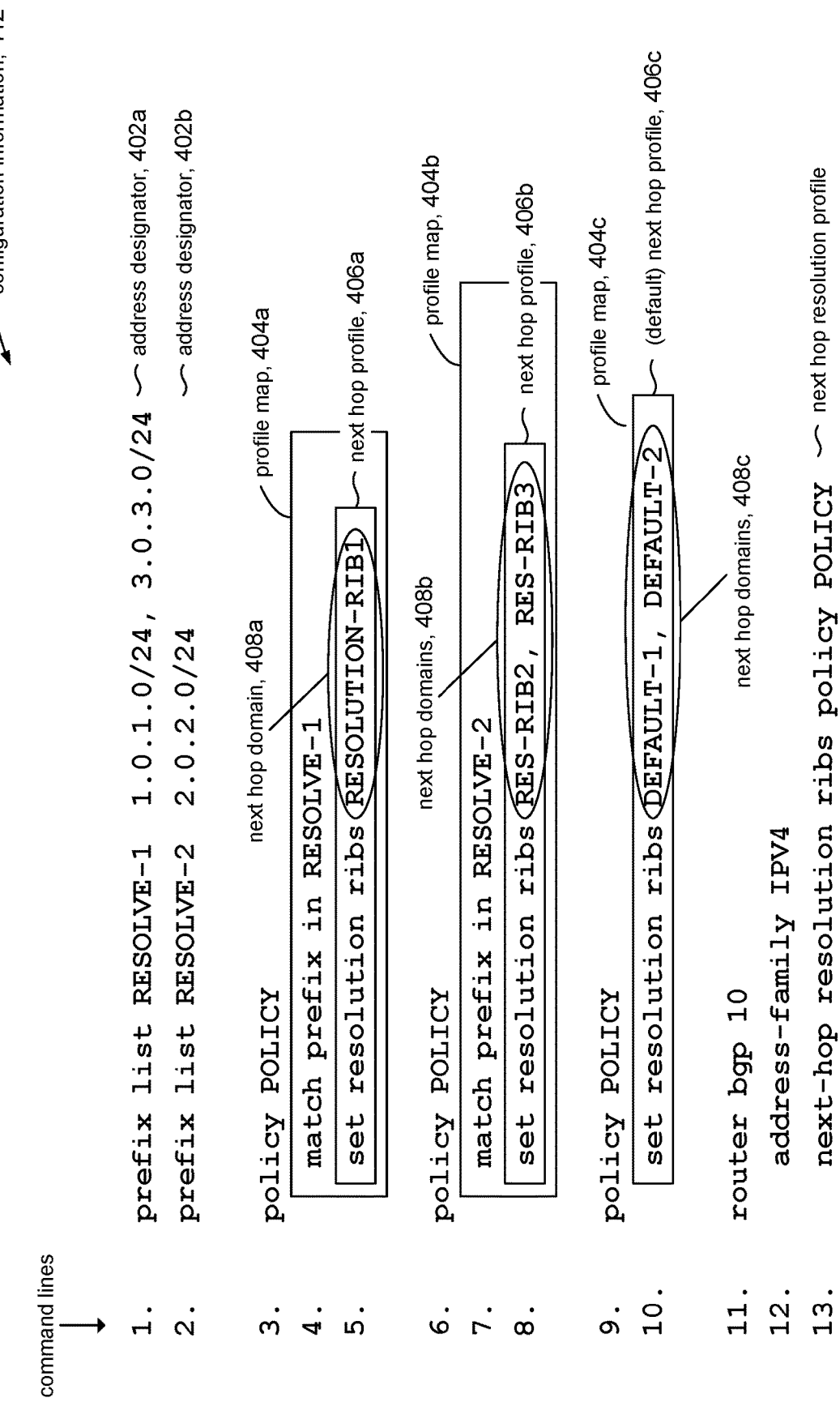

Referring to configuration information 422 in FIG. 4B, for example, command lines 9 and 10 add another profile map 404c comprising next hop profile 406c to the POLICY mapping. Next hop profile 406c is not associated with any address designators, so the profile will map to all routes. Next hop profile 406c comprises domains DEFAULT-1 and DEFAULT-2. In some embodiments, these domains can be user-defined domains, pre-defined system-wide domains, and so on.

Command lines 12 and 13 associate the mapping POLICY with the address family. As explained above, routes that are covered by the RESOLVE-1 address designator will be resolved according to next hop profile 406a, while routes that are covered by the RESOLVE-2 address designator will be resolved according to next hop profile 406b. Routes that are not covered by RESOLVE-1 or RESOLVE-2 will be resolved according to the domains that comprise profile 406c. Next hop profile 406c can be referred to as a "default" profile in that the profile is used to resolve a given next hop by default when the other profiles fail to resolve the given next hop.

Figure 5A:
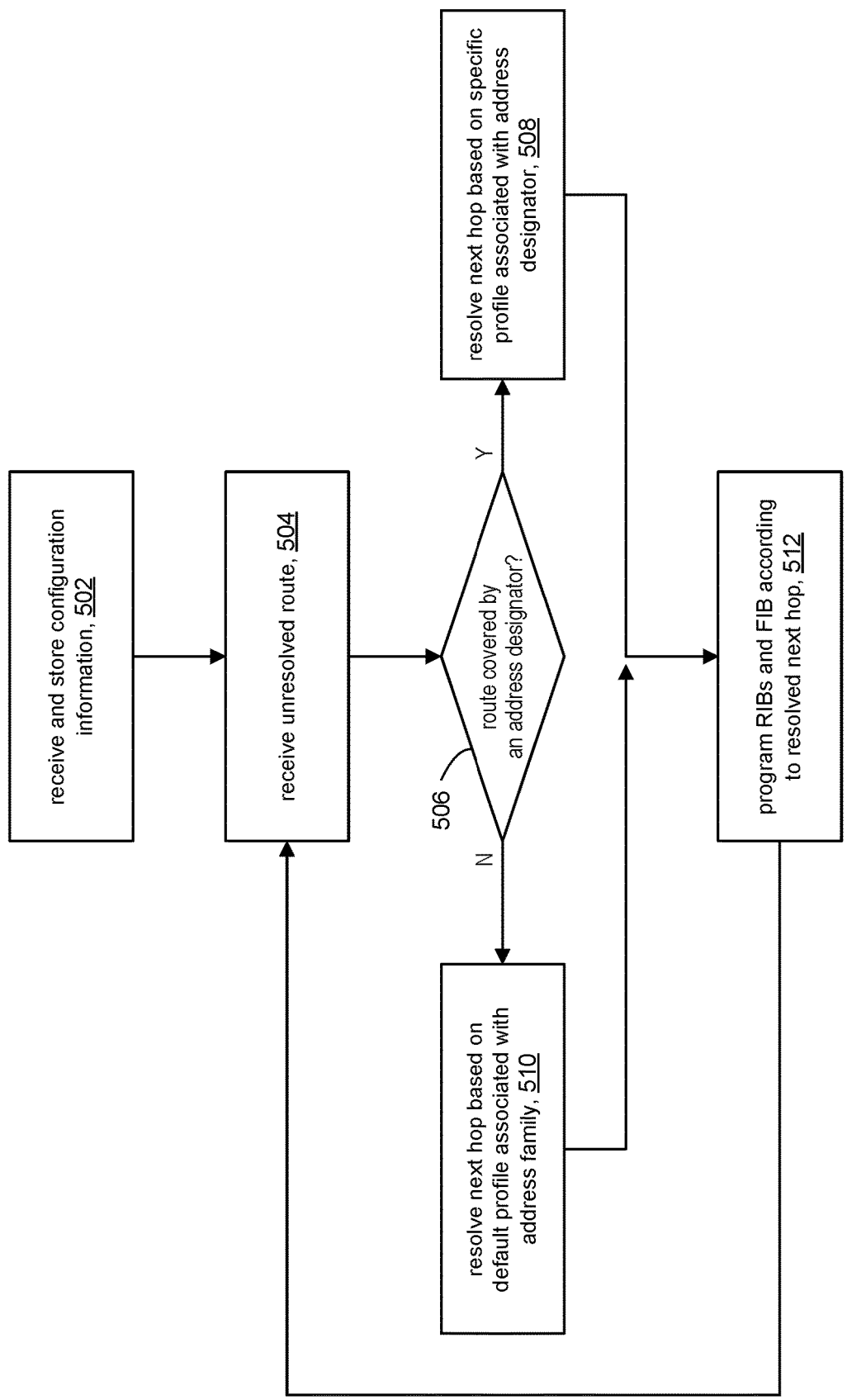
FIGS. 5A and 5B illustrate processing configuration information in accordance with some embodiments of the present disclosure with an example.
Figure 5B:
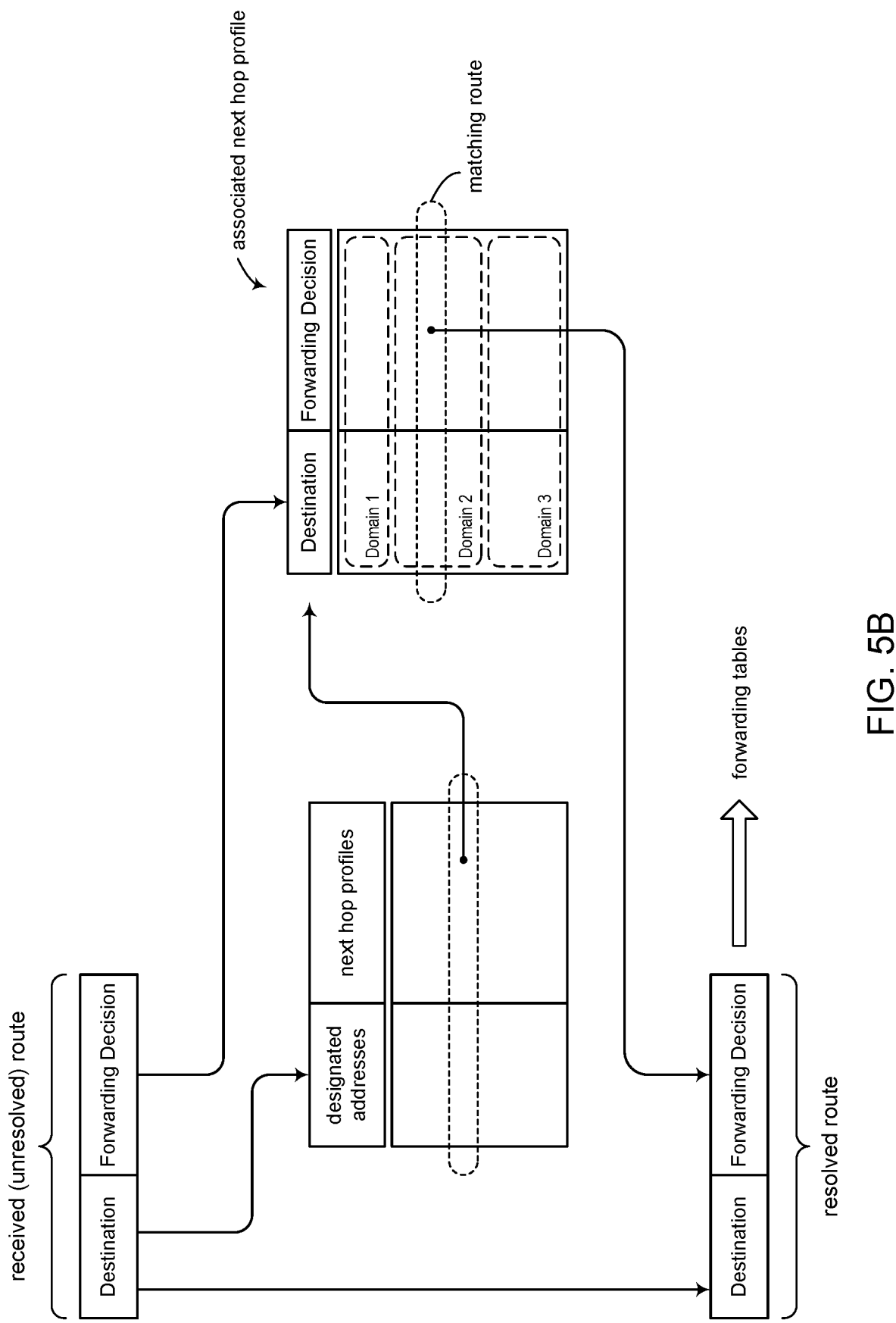

Referring to FIGS. 5A and 5B, the discussion will now turn to a high-level description of processing in a network device (e.g., 102, FIG. 1) to receive and process next hop resolution configuration information (e.g., 412, FIG. 4A) in accordance with the present disclosure. FIG. 5B is a pictorial illustration that represents next hop resolution in accordance with the present disclosure. In some embodiments, the network device can include one or more digital processing units, which when operated, can cause the network device to perform processing in accordance with FIG. 5A. Digital processing units can include general CPUs in the control plane that operate by way of executing computer program code stored on a non-volatile computer readable storage medium (e.g., read-only memory); for example, CPU 308 in the control plane shown in FIG. 3 can be a general CPU. Digital processing units can include specialized processors in the data plane such as digital signal processors, field programmable arrays, application specific integrated circuits, etc. that operate by way of executing computer program code or by way of being configured for specific operations; for example, internal fabric module 304 in the data plane shown in FIG. 3 can include one or more specialized processors.

At operation 502, the network device can receive configuration information (e.g., 422, FIG. 4B) from a user or from a centralized management system. The configuration information can be stored in a configuration database of the network device (e.g., 122, FIG. 1). The configuration information informs or otherwise guides the next hop resolution behavior in the network device to resolve routes. In some embodiments, next hop resolution behavior in the next hop device can proceed as follows:

At operation 504, the network device can receive a route. In some embodiments, for example, if the network device is running BGP, the network device can learn of routes by way of receiving BGP UPDATE messages (routes) advertised by BGP neighbors executing on other network devices. Routes can be entered by a user. Routes inform the network device where to forward an ingress packet. Referring to the above description of next hop profiles, the general format for a route is:

ROUTE:=DESTINATION, FORWARDING DECISION where, DESTINATION—As explained above, this attribute constitutes a match condition. Ingress packets that match on DESTINATION are forwarded according to FORWARDING DECISION. The DESTINATION attribute can be an IP address (e.g., expressed using prefix notation).

FORWARDING DECISION—As explained above, this attribute generally contains information that identifies a directly connected neighbor (the next hop), and information (e.g., IP-next hop, MPLS label stack imposition, tunneling encapsulation, etc.) that may be needed to forward/encapsulate a received ingress packet to reach the directly connected neighbor.

While the FORWARDING DECISION attribute in a received route contains information to reach a directly connected neighbor (the next hop), the FORWARDING DECISION attribute may not contain information that identifies an egress interface to reach the directly connected neighbor. For example, the FORWARDING DECISION may only indicate that the next hop is at some IP address. Accordingly, the network device will not know on which of its interfaces to forward a packet. Such a route can be referred to herein as an unresolved route. The next hop destination for the route needs to be resolved in order to identify an egress interface to reach a directly connected neighbor.

At decision point 506, if the unresolved route is covered by an address designator in the configuration information received at operation 502, then the network device can proceed according to operation 508 to resolve the next hop for the unresolved route based on a next hop resolution profile associated with the covering address designator. If the unresolved route is not covered by an address designator, then the network device can proceed according to operation 510 to resolve the next hop for the unresolved route based on a default next hop resolution profile. Referring to the illustrative configuration information shown in FIG. 4B, for example, the network device can determine if either of the address designators defined in configuration information 422, namely address designators 402a, 402b, cover DESTINATION specified in the unresolved route.

At operation 508, the network device can resolve the unresolved route based on the (specific) next hop profile associated with the address designator that covers DESTINATION designated in the unresolved route. FIG. 5B, for example, illustrates selection of the associated next hop profile from a list of next hop profiles using the DESTINATION attribute in the unresolved route. The network device can resolve the unresolved route's next hop using routes contained in the associated next hop profile. The network device can search the associated next hop profile to find a route in the next hop profile that resolves the FORWARDING DECISION attribute contained in the unresolved route. As illustrated in FIG. 5B, the network device can search the next hop profile to find a matching route in the next hop profile whose DESTINATION attribute covers (matches) the FORWARDING DECISION attribute in the unresolved route. The FORWARDING DECISION attribute in the matching route contains the interface on which to forward a packet to reach a directly connected neighbor. The DESTINATION attribute of the unresolved route and the FORWARDING DECISION attribute of the matching route from the next hop domain together constitute a resolved route.

In some embodiments, a next hop profile can contain one or more next hop domains. FIG. 5B, for example, shows three next hop domains in the associated next hop profile. The next hop domains comprising the next hop profile can be ordered so that an initial domain in the list is searched first. If a route is not found in the first domain (e.g., Domain 1), then routes in the next domain (e.g., Domain 2) in the list are searched, then routes in the next domain (e.g., Domain 3), and so on. When the network device identifies a matching route in a next hop domain that covers the FORWARDING DECISION attribute in the unresolved route, the unresolved route can be deemed resolved because the FORWARDING DECISION component in the matching route informs the egress interface on which to forward ingress packets covered by the unresolved route. The now-resolved route can be written to or otherwise installed in the forwarding tables (RIBs, FIB) of the network device at operation 512.

At operation 510, the network device can resolve the unresolved route based on a default next hop profile associated with the address family when none of the address designators (e.g., 402a, 402b) cover the unresolved route. The default profile can include an ordered list of next hop domains. Each next hop domain can be searched in sequential order as described above to identify a route in the next domain (covering route) that covers the unresolved route. If resolved, the unresolved route can be written to or otherwise installed in the forwarding tables (e.g., RIBs 124, FIB 126) of the network device at operation 512. In some embodiments, if the unresolved route is not resolved by a default domain, the route can be ignored.

At operation 512, the network device can update one or more of its forwarding tables with the DESTINATION and FORWARDING DECISION information contained in the covering route. Processing can return to operation 504 to receive and process another route.

Figure 6A:
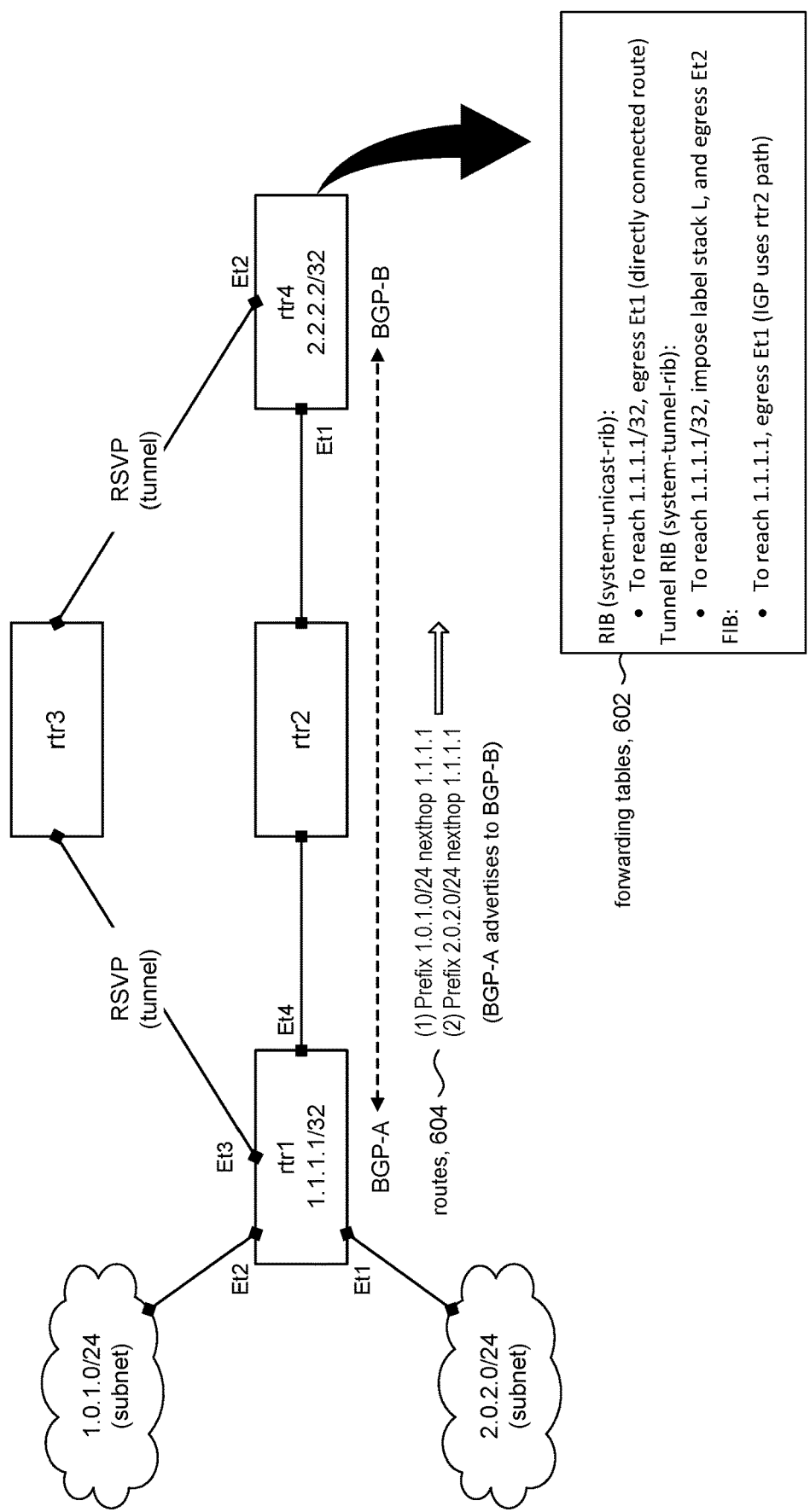
FIGS. 6A, 6B, and 6C show an example of processing configuration information in accordance with some embodiments of the present disclosure.
Figure 6B:
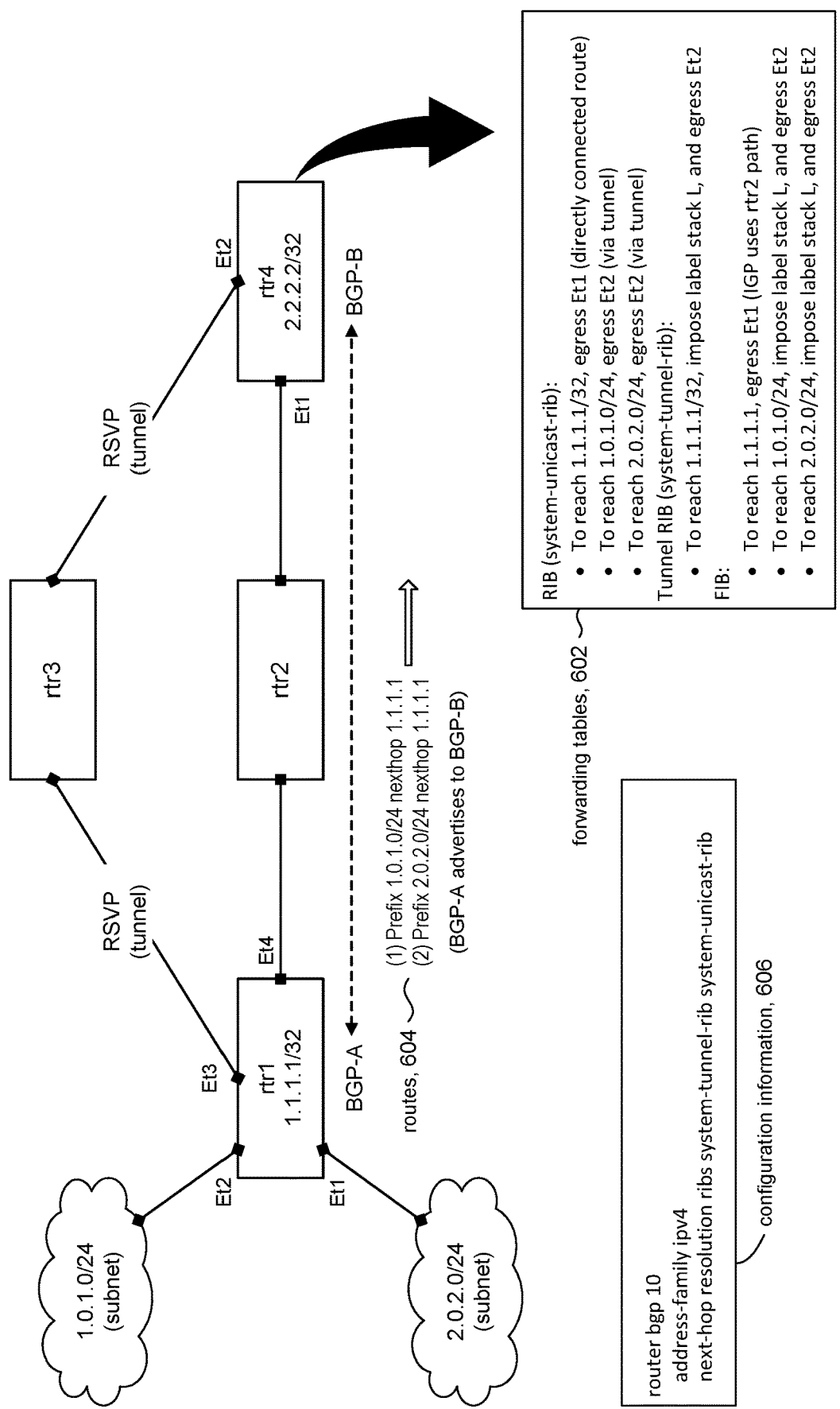
Figure 6C:
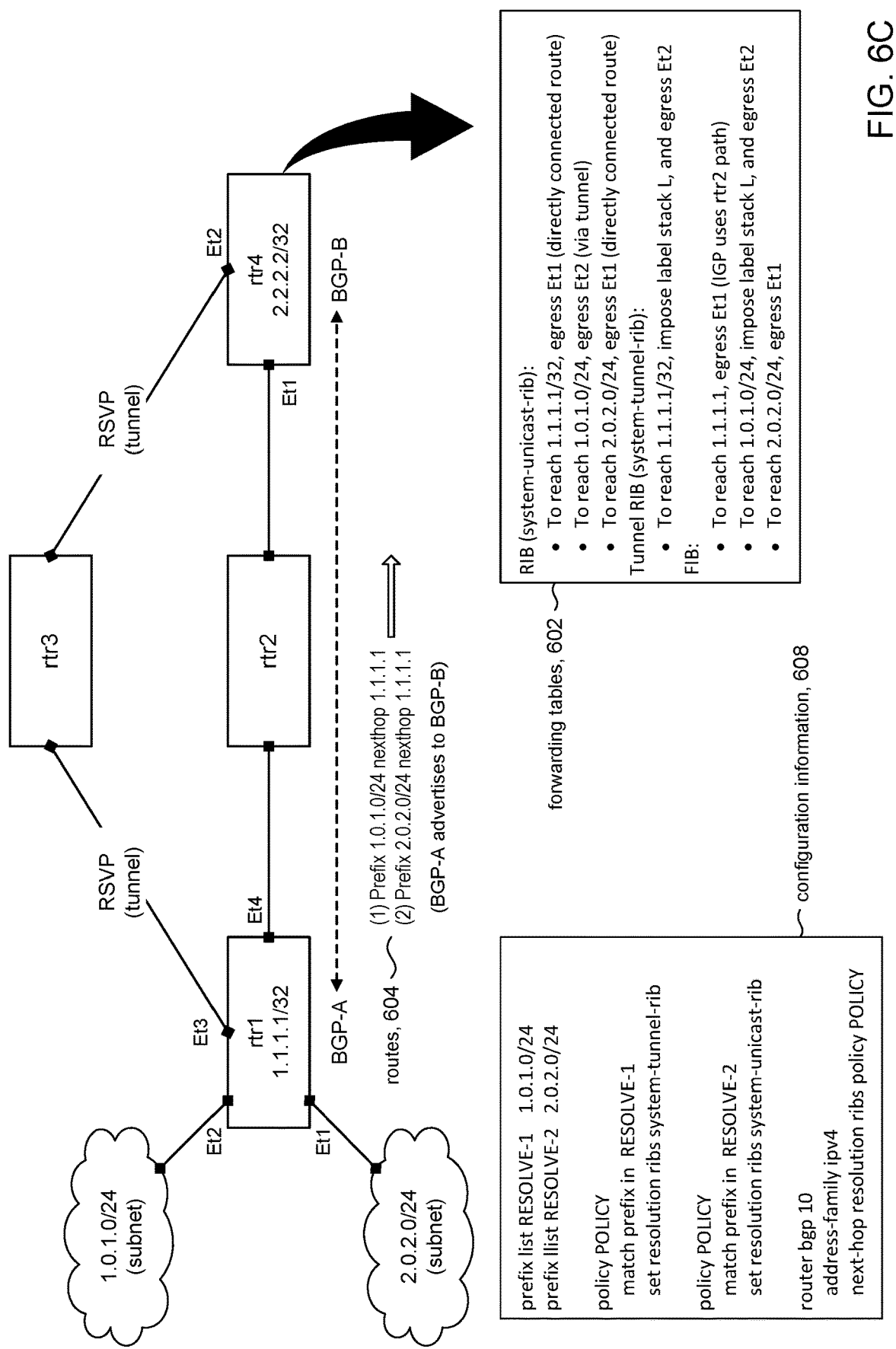

Referring now to FIGS. 6A, 6B, and 6C the operations in FIG. 5A are described using an example of a highly simplified network to illustrate aspects of next hop resolution in accordance with the present disclosure. The network shown in FIGS. 6A-6C includes four network devices rtr1, rtr2, rtr3, rtr4. To facilitate the discussion, we can assume without loss of generality the network has the following configuration:

the address family is a group of IPv4 addresses
a BGP session is running between rtr1 and rtr4
an Interior Gateway Protocol (IGP) like Open Shortest Path First (OSPF) or Intermediate System to Intermediate System (ISIS) is running on all the network devices
rtr1 can reach rtr4 through rtr3 using a tunnel established in accordance with Resource Reservation Protocol—Traffic Engineering (RSVP TE)
rtr1 can also reach rtr4 using IGP via rtr2 or rtr3

The example centers around next hop resolution behavior in network device rtr4. Rtr4 includes interfaces Et1 and Et2. Interface Et1 is directly connected to rtr2. Interface Et2 supports the RSVP TE tunnel.

FIG. 6A shows an initial state of forwarding tables 602 in rtr4. Forwarding tables 602 show two routes for 1.1.1.1/32, which reflect the network topology in FIG. 6A to reach rtr1 from rtr4. The system unicast RIB, for example, contains the route:

DESTINATION→1.1.1.1/32, FORWARDING DECISION→EGRESS ET1, and the system tunnel RIB contains the route:
DESTINATION→1.1.1.1/32, FORWARDING DECISION→IMPOSE LABEL STACK L, AND EGRESS ET2.

Suppose BGP-A (on rtr1) advertises two unicast routes 604 to BGP-B (on rtr4):
(1) PREFIX 1.0.1.0/24, NEXTHOP 1.1.1.1
(2) PREFIX 2.0.2.0/24, NEXTHOP 1.1.1.1.

Route (1) specifies a set of addresses in the address family of IPv4 addresses of a subnet identified by the 1.0.1.0/24 prefix. Route (2) specifies another set of addresses in the address family of IPv4 addresses of a subnet identified by the 2.0.2.0/24 prefix. Route (1) informs rtr4 that the next hop for ingress packets matching (covered by) 1.0.1.0/24 is at IP address 1.1.1.1; likewise for route (2). However, neither of the routes inform rtr4 on which interface to forward the packets; the routes need to be resolved. Rtr4 has two choices for resolving the next hop for route (1) and for route (2). Rtr4 can resolve the next hop over the system unicast RIB, which would yield Et1, or the system tunnel RIB which would yield Et2. FIGS. 6B and 6C show two resolution configurations for resolving routes (1) and (2).

Referring to FIG. 6B, rtr4 can be configured for next hop resolution at the address family level, where every route in the address family is resolved using the same next hop resolution profile. Configuration information 606 in FIG. 6B represents an example for configuring next hop resolution behavior in rtr4 to resolve next hops across the entire address family. Configuration information 606 defines a single resolution profile comprising two resolution domains, system tunnel RIB and the system unicast RIB, that is applied to all routes in the address family. More specifically, the system tunnel RIB domain can be checked first, and if the next hop is not resolved, then the system unicast RIB will be considered. Accordingly, rtr4 will resolve next hop IP address 1.1.1.1 in route (1) using the system tunnel RIB domain to yield:

to reach 1.0.1.0/24 egress Et2, impose label L (via RSVP tunnel)

as the FORWARDING DECISION. The system unicast RIB gets updated with this result and the same entry is added to the FIB when it gets programmed, as can be seen in FIG. 6B. Rtr4 will also resolve next hop IP address 1.1.1.1 for route (2) using the system tunnel RIB domain to yield the result:

to reach 2.0.2.0/24 egress Et2, impose label L (via RSVP tunnel).

The system unicast RIB gets updated (operation 512, FIG. 5) with this result and the same entry is added to the FIB when it gets programmed (e.g., by internal fabric module 304), as shown in FIG. 6B.

Consider now a situation where a user wants services or resources behind 2.0.2.0/24 to not use the RSVP tunnels, but instead to use the rtr2 path (via En). For example, the RSVP tunnel may be significantly higher bandwidth than the rtr2 path, so a premium may be placed on using the tunnel. The forwarding tables shown in FIG. 6B cannot resolve packets destined covered by 1.0.1.0/24 differently from packets covered by 2.0.2.0/24 because the same next hop resolution profile was used to resolve routes (1) and (2). Accordingly, rtr4 can only use the RSVP tunnel (via Et2) when forwarding packets covered by 1.0.1.0/24 and 2.0.2.0/24. However, as illustrated by the example in FIG. 6C, embodiments in accordance with the present disclosure can provide next hop resolution on a per route basis.

Referring to FIG. 6C, rtr4 in accordance with the present disclosure can be configured for more granular resolution of routes, where different next hop resolution profiles can be used to resolve individual routes within an address family. Configuration information 608 specifies different next hop resolution profiles for route (1) and route (2). The configuration information defines a next hop resolution profile for route (1) comprising the system tunnel RIB domain and another resolution profile for route (2) that comprises the system unicast RIB domain. Accordingly, rtr4 will resolve next hop 1.1.1.1 in route (1) using the system tunnel RIB domain to yield:

to reach 1.0.1.0/24→egress Et2, impose label L (via tunnel).

FIG. 6C shows that the system unicast RIB is updated (operation 512, FIG. 5) with this result, and the same entry is added to the FIB when it is programmed (e.g., by internal fabric module 304). Rtr4 will resolve next hop 1.1.1.1 in route (2), this time the system unicast RIB domain to yield:

to reach 2.0.2.0/24→egress Et1.

The system unicast RIB gets updated with this result and the same entry is added to the FIB when it gets programmed. Notably, we can see that although the BGP routes are within the same address family, they are resolved according to different resolution profiles.

Configuration information in accordance with the present disclosure can define next hop resolution behavior for an address family (group of addresses) on two levels. Routes in the address family, by default, are resolved in accordance with a default next hop resolution profile that can include one or more default next hop domains. Individual routes in the address family, however, can be specified and resolved according to respective specific resolution profiles, different from the default resolution profile. Consider BGP for example; a common technique is to use what are known as BGP extended color communities to provide differentiated levels of service based on "color." Next hop resolution profiles can be used to map different color communities to corresponding different resolution behaviors, thus allowing the service provider control over the resolution behavior at the granularity of individual routes.

Further Examples

In accordance with some embodiments of the present disclosure, a method in a network device comprises receiving a plurality of next hop profiles, each next hop profile comprising one or more next hop domains, each next hop domain comprising information that specifies one or more routes; receiving one or more address designators within an address group, each address designator specifying a subset of available addresses in the address group; receiving information that associates each of the address designators with one of the plurality of next hop profiles; and resolving a next hop for a received route. The resolving includes matching the received route with one of the address designators; identifying a route in the next hop profile associated with the matched address designator; and using the route identified in the next hop profile to resolve the received route. The method further includes forwarding a packet whose destination is on the resolved route, including using the resolved route to identify a next hop to which to forward the packet.

In some embodiments, the route identified in the next hop profile specifies an egress interface to reach a directly connected neighbor, wherein the received route is resolved by associating the received route with the egress interface.

In some embodiments, the method further comprises in response to the received route not matching any of the address designators, resolving the next hop for the received route using a default next hop profile associated with the address group to resolve the next hop destination. In some embodiments, the method further comprises receiving information that associates the default next hop profile with the address group.

In some embodiments, the next hop profile associated with the matched address designator includes a first next hop domain and a second next hop domain, wherein resolving the received route includes performing next hop resolution using the first next hop domain followed by performing next hop resolution using the second next hop domain in response to a failure to resolve the received route using the first next hop domain.

In some embodiments, the method further comprises updating forwarding tables in the network device with results from resolving the next hop for the received route.

In some embodiments, the method further comprises receiving from a user the plurality of next hop profiles, the one or more address designators, and the information that associates each of the address designators with one of the plurality of next hop profiles.

In accordance with some embodiments of the present disclosure, a method in a network device comprises associating a first next hop resolution profile with an address designator within an address group, the address designator specifying a subset of available addresses in the address group; associating second next hop resolution profile with the address group; performing next hop resolution on a route using the first next hop resolution profile to identify an egress interface to reach a directly connected neighbor when the route matches the address designator; and performing next hop resolution on the route using the second next hop resolution profile to identify the egress interface to reach the directly connected neighbor when the route does not match the address designator.

In some embodiments, the first next hop resolution profile and the second next hop resolution profile, each, comprises one or more fully resolved routes.

In some embodiments, the first next hop resolution profile and the second next hop resolution profile, each, comprises one or more next hop domains, wherein each next hop domain specifies one or more routes. In some embodiments, identifying the egress interface associated with the route includes performing next hop resolution using the first next hop domain wherein next hop resolution is performed using the second next hop domain in response to a failure to resolve the route using the first next hop domain.

In some embodiments, the method further comprises storing a result of resolving the route in forwarding tables of the network device.

In some embodiments, the method further comprises receiving input from a user comprising the first next hop resolution profile and the second next hop resolution profile.

In accordance with some embodiments of the present disclosure, a network device comprises a plurality of interfaces; one or more computer processors; and a computer-readable storage medium comprising instructions for controlling the one or more computer processors to: store a plurality of next hop resolution profiles; store a plurality of address designators within an address family, each address designator specifying a subset of available addresses in the address family; receive a route that is within the address family; and resolve the route to identify one of the plurality of interfaces as an egress interface to reach a directly connected neighbor, wherein when the route matches one of the address designators, the egress interface is identified from a next hop resolution profile that is associated with the address designator that matches the route, wherein when the route does not match any of the address designators, the egress interface is identified from a next hop resolution profile that is associated with the address family; and program a forwarding table to store an association between the resolved route and the identified egress interface.

In accordance with some embodiments, the computer-readable storage medium further comprises instructions for controlling the one or more computer processors to forward a packet whose destination is on the resolved route, including using the resolved route to identify an egress interface on to egress the packet.

In accordance with some embodiments, each of the plurality of next hop resolution profiles comprises one or more routes, wherein each of the one or more routes designates one of the plurality of interfaces on the network device.

In accordance with some embodiments, each of the next hop resolution profiles comprises one or more next hop domains, wherein each next hop domain specifies one or more routes.

In accordance with some embodiments, the computer-readable storage medium further comprises instructions for controlling the one or more computer processors to store a result of resolving the route in forwarding tables of the network device.

In accordance with some embodiments, the computer-readable storage medium further comprises instructions for controlling the one or more computer processors to receive input from a user comprising the first next hop resolution profile and the second next hop resolution profile.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device, the method comprising:
receiving a plurality of next hop profiles, each next hop profile comprising one or more next hop domains, each next hop domain comprising information that specifies one or more routes;
receiving one or more address designators within an address group, each address designator specifying a subset of available addresses in the address group;
receiving information that associates each of the address designators with one of the plurality of next hop profiles;
resolving a next hop for a received route, including:
matching the received route with one of the address designators;
identifying a route in the next hop profile associated with the matched address designator; and
using the route identified in the next hop profile to resolve the received route; and
forwarding a packet whose destination is on the resolved route, including using the resolved route to identify a next hop to which to forward the packet.

2. The method of claim 1, wherein the route identified in the next hop profile specifies an egress interface to reach a directly connected neighbor, wherein the received route is resolved by associating the received route with the egress interface.

3. The method of claim 1, further comprising in response to the received route not matching any of the address designators, resolving the next hop for the received route using a default next hop profile associated with the address group to resolve the next hop destination.

4. The method of claim 3, further comprising receiving information that associates the default next hop profile with the address group.

5. The method of claim 1, wherein the next hop profile associated with the matched address designator includes a first next hop domain and a second next hop domain, wherein resolving the received route includes performing next hop resolution using the first next hop domain followed by performing next hop resolution using the second next hop domain in response to a failure to resolve the received route using the first next hop domain.

6. The method of claim 1, further comprising updating forwarding tables in the network device with results from resolving the next hop for the received route.

7. The method of claim 1, further comprising receiving from a user the plurality of next hop profiles, the one or more address designators, and the information that associates each of the address designators with one of the plurality of next hop profiles.

8. A method in a network device, the method comprising:
associating a first next hop resolution profile with an address designator within an address group, the address designator specifying a subset of available addresses in the address group;
associating a second next hop resolution profile with the address group;
performing next hop resolution on a route using the first next hop resolution profile to identify an egress interface to reach a directly connected neighbor when the route matches the address designator; and
performing next hop resolution on the route using the second next hop resolution profile to identify the egress interface to reach the directly connected neighbor when the route does not match the address designator.

9. The method of claim 8, wherein the first next hop resolution profile and the second next hop resolution profile, each, comprises one or more fully resolved routes.

10. The method of claim 8, wherein the first next hop resolution profile and the second next hop resolution profile, each, comprises one or more next hop domains, wherein each next hop domain specifies one or more routes.

11. The method of claim 10, wherein identifying the egress interface associated with the route using a given one of the first or second next hop resolution profiles includes performing next hop resolution using a first next hop domain in the given next hop resolution profile, followed by performing wherein next hop resolution using a second next hop domain in the given next hop resolution profile in response to a failure to resolve the route using the first next hop domain.

12. The method of claim 8, further comprising storing a result of resolving the route in forwarding tables of the network device.

13. The method of claim 8, further comprising receiving input from a user comprising the first next hop resolution profile and the second next hop resolution profile.

14. A network device comprising:
a plurality of interfaces;
one or more computer processors; and
a computer-readable storage medium comprising instructions for controlling the one or more computer processors to:
store a plurality of next hop resolution profiles;
store a plurality of address designators within an address family, each address designator specifying a subset of available addresses in the address family;
receive a route that is within the address family; and
resolve the route to identify one of the plurality of interfaces as an egress interface to reach a directly connected neighbor, wherein when the route matches one of the address designators, the egress interface is identified from a next hop resolution profile that is associated with the address designator that matches the route, wherein when the route does not match any of the address designators, the egress interface is identified from a next hop resolution profile that is associated with the address family; and program a forwarding table to store an association between the resolved route and the identified egress interface.

15. The network device of claim 14, wherein the computer-readable storage medium further comprises instructions for controlling the one or more computer processors to forward a packet whose destination is on the resolved route, including using the resolved route to identify an egress interface on to egress the packet.

16. The network device of claim 14, wherein each of the plurality of next hop resolution profiles comprises one or more routes, wherein each of the one or more routes designates one of the plurality of interfaces on the network device.

17. The network device of claim 14, wherein each of the next hop resolution profiles comprises one or more next hop domains, wherein each next hop domain specifies one or more routes.

18. The network device of claim 14, wherein the computer-readable storage medium further comprises instructions for controlling the one or more computer processors to store a result of resolving the route in forwarding tables of the network device.

19. The network device of claim 14, wherein the computer-readable storage medium further comprises instructions for controlling the one or more computer processors to receive input from a user comprising the plurality of next hop resolution profiles.

* * * * *